Figures 1, 2:
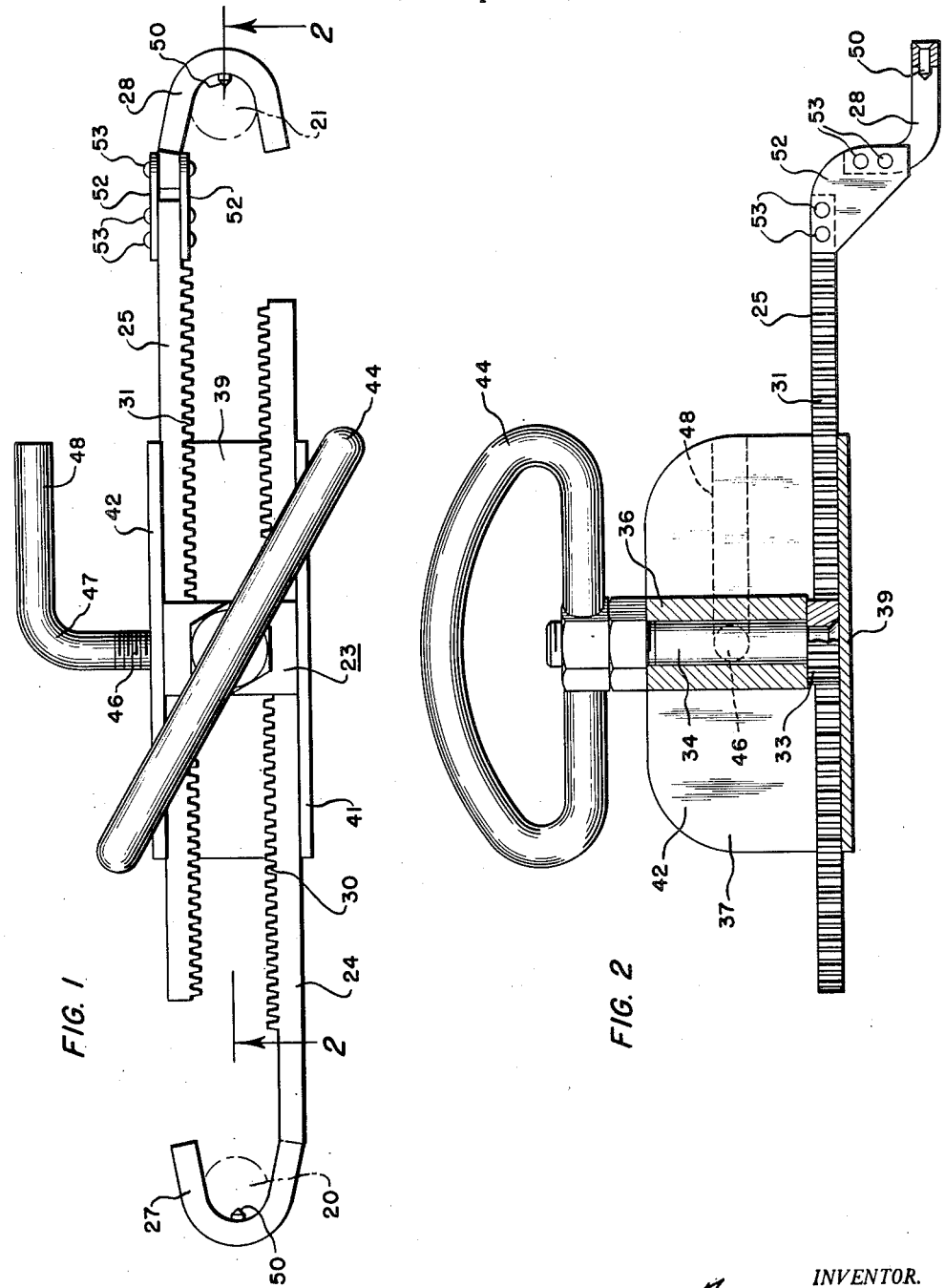

May 20, 1958   F. O. YOUNG   2,835,527
DEVICE FOR CARRYING A STORAGE BATTERY
Filed April 12, 1956

INVENTOR.
Frank O. Young
BY
ATTORNEYS

United States Patent Office 2,835,527
Patented May 20, 1958

2,835,527

DEVICE FOR CARRYING A STORAGE BATTERY

Frank O. Young, San Diego, Calif.

Application April 12, 1956, Serial No. 577,734

5 Claims. (Cl. 294—16)

The present invention relates to a battery carrier, particularly to a carrier which can be locked to the terminals of a storage battery.

In carrying out the present invention, I employ two elements, each being adapted to lock with spaced parts of a storage battery, preferably the two terminals of the battery. At least one of these elements is, and preferably each of these elements is, provided with a rack section. A pinion cooperates with the rack section or sections, which pinion, when turned on its axis, will move the locking elements relative to one another for moving such elements into and out of locking relationship with the battery terminals. I also provide means for locking the elements in locking engagement with the terminals of the battery, and this means preferably includes a set screw for locking the pinion in fixed position.

Further objects and advantages will be apparent from the following description, reference being had to the accompanying drawings wherein a preferred embodiment of the invention is illustrated.

In the drawings:

Fig. 1 is a top plan view of my improved battery carrier, showing the battery terminals in dash and dot lines; and Fig. 2 is a view partly in section, the section being taken on line 2—2 of Fig. 1.

Referring more in detail to the drawings, the dot and dash lines represent the terminals 20 and 21 of a storage battery. The battery carrier 23 comprises two elements 24 and 25; element 24 is provided with a hook section 27 and element 25 is provided with a hook section 28. These hook sections are arranged to hook about and lock with the terminals 20 and 21 of the storage battery.

Means is provided for moving the hook sections 27 and 28 toward and away from one another. This means comprises rack and pinion mechanism and an element for retaining the rack and pinion in cooperative relationship. At least one of the elements 24 or 25 is provided with a rack section; preferably each of said elements includes a rack section, and such sections are shown at 30 and 31, respectively. These rack sections are moved parallelly of one another and in opposite directions simultaneously by a pinion 33.

Pinion 33 is carried by a vertically extending shaft 34, which latter is journaled in an upright bearing 36. Bearing 36 is cast integrally with or welded to a guide element 37. This guide element is U-shaped in cross-section and includes a base 39, which slidably supports the rack sections 30 and 31, and two upright side walls 41 and 42 providing guides for the rack sections 30 and 31, i. e., retains the rack sections in cooperative relationship with the pinion 33.

The pinion 33 is secured to and therefore rotatable with the shaft 34, and the shaft 34 is provided with a handle 44 for rotating the same. The pinion and racks can be locked in position, and, in the preferred embodiment, this is accomplished by locking the shaft in position; a screw 46, bent as at 47 to provide a handle 48, is threaded through the side wall 42 and bearing 34 and is arranged to lockingly engage with the shaft 34 to prevent rotation thereof.

In operating the device, the handle 44 is turned clockwise, as viewed in Fig. 1, whereby, through pinion 33 and rack sections 30 and 31, element 24, including hook section 27, is moved to the left, and element 25, including hook section 28, is moved to the right. These elements are moved a sufficient distance so that the hook sections 27 and 28 span the battery terminals 20 and 21. After hooking about the battery terminals, the racks are moved in the opposite directions by pinion 33, i. e., hook section 27 is moved to the right and section 28 is moved to the left to lock or bind with the respective battery terminals. In order to insure positive locking of the hook sections with the battery terminals, I provide pins 50 which are adapted to penetrate into the soft (usually lead) battery terminals. After the hook sections are brought into binding relationship with the battery terminals, the screw 46 is turned to lock with the shaft 34 to secure the pinion against turning, thus preventing separation of the hooks from the terminals of the battery. The battery can then be lifted by the handle 44.

To prevent short-circuiting of the battery, one hook section must be insulated from the other. Either one of the racks may be formed or coated with insulating material. To simplify the showing of insulation of one hook from the other, I show hook section 28 separated from rack section 25 by insulating straps 52 held in place by rivets 53.

While the form of embodiment herein shown and described constitutes a preferred form, it is to be understood that other forms may be adopted falling within the scope of the claims that follow.

I claim:

1. A battery carrier for a battery having spaced upright terminals, comprising two elongated and parallelly arranged elements, each having an end, said ends having pins adapted to engage and pierce spaced terminals of the battery; means on one of said elements electrically insulating said ends from one another; means for maintaining said elements in cooperative parallel relationship, at least one of said elements having a rack section; a pinion cooperating with the rack section for moving one element parallelly and longitudinally relative to the other of said elements; and means for preventing turning of said pinion for locking said elements relative to one another.

2. A battery carrier for a battery having spaced upright terminals, comprising two elongated and parallelly arranged elements, each having an end, said ends having pins adapted to engage and pierce spaced terminals of the battery, each of said elements having a toothed rack section, the teeth of said sections confronting one another; means forming guides for supporting and guiding said elements for relative longitudinal parallel movement with respect to one another, said means forming an upright bearing for a shaft; a vertically extending shaft rotatably journalled in said bearing; a pinion attached to the shaft and disposed to mesh with the teeth of said rack sections for moving said elements parallelly longitudinally of one another; means for preventing turning of the pinion for locking said elements together; and means on one of said elements electrically insulating the ends of said elements from one another.

3. A battery carrier for a battery having spaced upright terminals, comprising two elongated and parallelly arranged elements, each having an end, said ends having pins adapted to engage and pierce spaced terminals of the battery, each of said elements having a toothed rack section, the teeth of said sections confronting one another; means forming guides for supporting and guiding said elements for relative longitudinal parallel movement with respect to one another, said means forming an upright bearing for a shaft; a vertically extending shaft rotatably journalled in said bearing; a pinion attached to the shaft and disposed to mesh with the teeth of said rack sections for moving said elements parallelly longitudinally of one another; a set screw extending horizontally through said upright bearing and engageable with the shaft for preventing turning thereof; and means on one of said elements electrically insulating the ends of said elements from one another.

4. A battery carrier for a battery having spaced upright terminals, comprising two elongated and parallely arranged elements, each having an end, said ends having pins adapted to engage and pierce spaced terminals of the battery, each of said elements having a toothed rack section, the teeth of said sections confronting one another; a U-shaped member including parallel side walls and a connecting base forming guides and supports for the elements; an upright bearing carried by the U-shaped member; a vertically extending shaft rotatably journalled in said bearing; a pinion attached to the shaft and disposed to mesh with the teeth of said rack sections for moving said elements parallelly longitudinally of one another; means for preventing turning of the pinion for locking said elements together; and means on one of said elements electrically insulating the ends of said elements from one another.

5. A battery carrier for a battery having spaced upright terminals, comprising two elongated and parallelly arranged elements, each having an end, said ends having pins adapted to engage and pierce spaced terminals of the battery, each of said elements having a toothed rack section, the teeth of said sections confronting one another; a U-shaped member including parallel side walls and a connecting base forming guides and supports for the elements; an upright bearing carried by the U-shaped member; a vertically extending shaft rotatably journalled in said bearing; a pinion attached to the shaft and disposed to mesh with the teeth of said rack sections for moving said elements parallelly longitudinally of one another; a set screw extending horizontally through said upright bearing and engageable with the shaft for preventing turning thereof; including means on one of said elements electrically insulating the ends of said elements from one another.

References Cited in the file of this patent

UNITED STATES PATENTS

| | | |
|---|---|---|
| 1,578,120 | Harris | Mar. 23, 1926 |
| 1,807,124 | Myer | May 26, 1931 |
| 1,894,556 | Edlund | Jan. 17, 1933 |
| 1,943,611 | Johnson | Jan. 16, 1934 |
| 2,126,605 | Beery | Aug. 9, 1938 |
| 2,158,646 | Wiora | May 16, 1939 |
| 2,198,652 | Cullen et al. | Apr. 30, 1940 |
| 2,390,293 | Colson | Dec. 4, 1945 |